US011923683B2

(12) United States Patent
Chatillon (10) Patent No.: US 11,923,683 B2
(45) Date of Patent: Mar. 5, 2024

(54) RESILIENT MICRO-NETWORK OF ELECTRICAL RADIATOR-TYPE HEATING APPLIANCES

(71) Applicant: LANCEY ENERGY STORAGE, Grenoble (FR)

(72) Inventor: Yohann Chatillon, St jean de moirans (FR)

(73) Assignee: LANCEY ENERGY STORAGE, Grenoble (FR)

( * ) Notice: Subject to any disclaimer, the term of this patent is extended or adjusted under 35 U.S.C. 154(b) by 0 days.

(21) Appl. No.: 17/779,781

(22) PCT Filed: Nov. 26, 2020

(86) PCT No.: PCT/FR2020/052187
§ 371 (c)(1),
(2) Date: May 25, 2022

(87) PCT Pub. No.: WO2021/105621
PCT Pub. Date: Jun. 3, 2021

(65) Prior Publication Data
US 2023/0006445 A1 Jan. 5, 2023

(30) Foreign Application Priority Data

Nov. 27, 2019 (FR) ..................... 19/13291

(51) Int. Cl.
*H02J 3/14* (2006.01)
*F24H 15/414* (2022.01)
(Continued)

(52) U.S. Cl.
CPC .............. *H02J 3/14* (2013.01); *F24H 15/414* (2022.01); *H02J 7/0048* (2020.01);
(Continued)

(58) Field of Classification Search
CPC .. H02J 3/14; H02J 13/00004; H02J 7/007192; H02J 7/0048; H02J 7/007182;
(Continued)

(56) References Cited

U.S. PATENT DOCUMENTS 7,149,605 B2 * 12/2006 Chassin ............ H02J 13/00004
700/286

FOREIGN PATENT DOCUMENTS

| CN | 102623991 B | 11/2014 |
|---|---|---|
| CN | 207612124 U | 7/2018 |

(Continued)

OTHER PUBLICATIONS

International Search Report dated Feb. 12, 2021 re: Application No. PCT/FR2020/052187, pp. 1-3, citing: WO 2019097130 A1, EP 3413431 A1, CN 207612124 U and CN 102623991 B.

*Primary Examiner* — Carlos Amaya
(74) *Attorney, Agent, or Firm* — CANTOR COLBURN LLP (57) ABSTRACT

A micro-network comprising includes at least two heating appliances provided with communication modules, one being used for obtaining and transmitting a first data set having at least one measurement related to the electricity consumption of the heating appliance, at least one measurement related to the electricity production of same and at least one measurement related to a state of charge of an electrical energy storage device, and subsequently controlling the power supply to the heating member. The other communication module is used for obtaining, and transmitting to a supervision module, first and second data sets including at least one item of data relating to an electrical power source, and subsequently transmitting a first setpoint state of charge related to the state of charge of the electrical energy storage device of the other heating device. The first setpoint state of (Continued)

charge is taken into account when controlling the power supply to the heating member.

14 Claims, 3 Drawing Sheets

(51) Int. Cl.
*H02J 7/00* (2006.01)
*H02J 13/00* (2006.01)

(52) U.S. Cl.
CPC .. *H02J 7/007182* (2020.01); *H02J 7/007192* (2020.01); *H02J 13/00004* (2020.01); *H02J 2310/14* (2020.01); *H02J 2310/60* (2020.01)

(58) Field of Classification Search
CPC .. H02J 2310/14; H02J 2310/60; F24H 15/414
See application file for complete search history.

(56) References Cited

FOREIGN PATENT DOCUMENTS

| | | | |
|---|---|---|---|
| EP | 2735067 | A1 | 5/2014 |
| EP | 2961032 | A1 | 12/2015 |
| EP | 3384727 | A1 | 10/2018 |
| EP | 3413431 | A1 | 12/2018 |
| FR | 3059199 | A1 | 5/2018 |
| WO | 2019097130 | A1 | 5/2019 |

* cited by examiner

RESILIENT MICRO-NETWORK OF ELECTRICAL RADIATOR-TYPE HEATING APPLIANCES

TECHNICAL FIELD

The present disclosure concerns a micro-grid including at least:
- a first heating appliance comprising a first electrical energy storage device adapted to be recharged by an electric power supply source, at least one first heater member adapted to be powered from the electric power supply source and/or from the first electrical energy storage device, and a first communication module,
- a second heating appliance comprising a second electrical energy storage device adapted to be recharged by the electric power supply source, at least one second heater member adapted to be powered from the electric power supply source and/or from the second electrical energy storage device, and a second communication module.

The disclosure also concerns an electrical installation comprising an electric power supply source and at least one such micro-grid.

In the following, the electric power supply source may include an electrical grid delivering an alternating current voltage and/or all or part of the following elements adapted to deliver a direct voltage: photovoltaic panels, a fuel cell, a supercapacitor, an electrochemical cells assembly-based battery, a wind turbine.

BACKGROUND

The growing contribution of renewable and decentralized energy sources in the medium and low voltage electric distribution grid raises new technical challenges for grid operators. In particular, in the case of smart grids, the intermittency of the availability of these energy sources as well as the variability of the power produced by them must be taken into account and optimized, in order to ensure a balance between the energy production and its consumption by equipment connected to these grids.

To meet these balance requirements, grid operators have put in place contractual offers for the management of capacity reserves thanks to which, at variable deadlines, additional capacities made available by energy producers may be requested and/or or consumption limits may be imposed according to a pre-established pattern. Thus, in this mode of management, a distinction is usually made between the primary reserve (energy available in a few seconds), the secondary reserve (energy available in a few minutes), and tertiary reserve (energy available or a reduction in energy consumption at a longer time frame than the primary and secondary reserve, generally more than 15 minutes).

At the individual housing level, it has been suggested to involve some equipments coupled to the electrical grid in this management of capacity reserves.

Thus, it is known from the document EP-B1-2735067 the measurement and the modulation, in real time, of the electrical consumption of a site, the electrical consumption of one or several devices being interrupted, when necessary. However, this solution requires the installation of a casing (generally placed at the electrical panel of a consumer/producer site whose consumption is to be at least partly deleted), in order to carry out measurements on the electrical grid of the site, and to control the appliances likely to be interrupted. Furthermore, it imposes on the consumer an interruption of service beyond his control. This solution is therefore not suitable, in particular for dwellings equipped with heater operating by means of electricity such as heat pump systems, electrical radiators, due to the discomfort caused by these unexpected interruptions as well as the impossibility of managing the thermal dynamics of the dwelling in an optimized manner.

The document EP-B1-2961032 suggests to manage the sharing of resources between producer and/or consumer equipments, by coupling, to an equipment of the grid, a module for analyzing inner data of the equipment, calculate its intrinsic modulation capacity, and send a modulation offer accordingly. This solution also requires the installation of a module on each of the devices likely to participate in the capacity mechanism. Similarly, each deleted equipment does no longer provide service: this solution is therefore also not suitable for dwellings equipped with heater operated by means of electricity.

SUMMARY

The present disclosure aims at solving all or part of the above-mentioned drawbacks.

In this context, patent applications EP-A1-3384727 and FR-A1-3059199 have been filed by the Applicant, and suggest the use of an electrical radiator provided with an electrical energy storage device and a heater member adapted to be powered from an electric power supply source (which may include an alternating current electrical grid and/or elements providing direct current) and/or by the electrical energy storage device. Such an electrical radiator is not only capable of providing electric power to cover its own needs, but also to the electrical grid to which it is connected, in order in particular to power other local consuming devices. The use of the energy stored by such an electrical radiator also makes it possible, during a period of consumption cut-off, to ensure continuity of service, which proves to be particularly advantageous for a heating system of a house or building.

The present disclosure aims at providing additional means for improving the efficiency of energy flow management for a site in which a plurality of electrical radiators are deployed, each provided with an electrical energy storage device and a heater member adapted to be powered by an electric power supply source and/or by the energy storage device. By "site" it should be understood a space in which an electric power supply source is deployed and in which the plurality of heating appliances is installed, typically a dwelling, a house, a building, or even a district.

The present disclosure also aims at providing resilient means adapted to withstanding the failure or temporary unavailability of one or several equipment(s).

The present disclosure makes it possible to more generally optimize the management of the energy in an electrical grid.

This is why there is still a need to provide a resilient micro-grid of heating appliances where at least some of these heating appliances are provided with an electrical energy storage device and a heater member adapted to be selectively powered by the electric power supply source and/or by the energy storage device, which is simple, economical, reliable, easy to implement, and allowing the heating function of the heating appliances of the micro-grid not to be interrupted.

To this end, according to a first aspect, a micro-grid is suggested including at least:
- a first heating appliance comprising a first electrical energy storage device adapted to be recharged from an electric power supply source, at least one first heater member adapted to be powered from the electrical power supply source and/or from the first storage device, and a first communication module, a second heating appliance comprising a second electrical energy storage device adapted to be recharged from the electrical power supply source, at least one second heater member adapted to be powered from the electrical power supply source and/or from the second electrical energy storage device, and a second communication module, a supervision module adapted to communicate at least with the second communication module, the micro-grid in which:

i) the first communication module is configured to:

obtain, and transmit to the second communication module, a first set of data comprising:

at least one measurement related to an electrical consumption of the first heating appliance, where said electrical consumption of the first heating appliance is an amount of electrical energy transmitted to the first heating appliance by the electrical power supply source, at least one measurement related to an electrical production of the first heating appliance, where said electrical production of the first heating appliance is an amount of electrical energy consumed by the first heating appliance from the first electrical energy storage device, and at least one measurement related to an actual state of charge of the first electrical energy storage device, control the power supply of the first heater member from the first electrical energy storage device and/or from the electric power source taking into account the measurement related to the actual state of charge of the first electrical energy storage device and a first state of charge setpoint related to a target state of charge of the first electrical energy storage device, ii) the second communication module is configured so as to:

obtain, and transmit to the supervision module, the first set of data, obtain and transmit to the supervision module, a second set of data distinct from the first set of data, the second set of data including at least one data related to the electric power supply source and at least one measurement related to an actual state of charge of the second electrical energy storage device, receive from the supervision module, and transmit to the first communication module, said first state of charge setpoint, receive, from the supervision module, a second state of charge setpoint related to a target state of charge of the second electrical energy storage device, control the power supply of the second heater member from the second electrical energy storage device and/or from the electric power source taking into account the measurement related to the actual state of charge of the second electrical energy storage device and of the second state of charge setpoint, iii) the supervision module is configured so as to:

receive the first set of data and the second set of data, generate from the first set of data and the second set of data, and transmit to the second communication module, the first state of charge setpoint and the second state of charge setpoint.

According to a particular embodiment, the first communication module is configured to control the power supply of the first heater member from the first electrical energy storage device on receipt of an cut-off instruction, while the second communication module is configured so as to transmit, upon receipt of the cut-off instruction destined for the first communication module, said cut-off instruction to the first communication module, the supervision module being configured so as to check whether at least one cut-off instruction of the first heating appliance is satisfied based on the first set of data and the second set of data, and when the cut-off condition is satisfied, transmit to the second communication module said cut-off instruction destined for the first communication module.

Thus, the supervision module can emit optimized cut-off instructions to the heating appliances of the micro-grid, taking into account data specific to each of the heating appliances—such as its electrical consumption, its state of charge—and to data related to the electrical grid of the electric power source—current total consumption, current production, pricing schedule, etc.

The first and second sets of data can be collected in real time, that is to say received by the supervision module typically in less than 2 or 3 seconds after obtaining the corresponding measurement or data, and with a frequency of the instruction of collecting the first and second sets of data every 1 to 10 seconds. The disclosure therefore allows a monitoring adapted to the task of optimizing the energy management of the site's electric power source, because it makes it possible to obtain from the supervision module a good reactivity as regards the taking of relevant decisions for the considered energy and time context.

In addition, when a cut off instruction is received by the first communication module, the first heater member of the first heating appliance to which the first communication module is coupled ceases to use the resources of the electric power source and is powered by means of the first electrical energy storage device. The heating function of the concerned heating appliance is therefore not interrupted.

Furthermore, the supervision module may take into account all the heating appliances of the micro-grid as well as electrical grid status and constraints to determine if the cut-off condition of the first heating appliance is met, allowing decisions that are informed by a overall view of the heating appliances of the micro-grid and of the electrical grid, to be made.

According to a particular embodiment, said at least one cut-off condition of the first heating appliance includes a condition according to which the measurement related to the actual state of charge of the first electrical energy storage device is above a predetermined charge threshold of the first electrical energy storage device, as a function of at least one data of the data from the first set of data and at least one data of the data from the second set of data.

It is thus possible to take into account not only the specific features of the first heating appliance, such as the technology of the first electrical energy storage device or its state of charge, but also to dynamically adapt this threshold according to constraints external to the first heating appliance, such as constraints related to the electric power source.

According to a particular embodiment, the first heating appliance is configured so as to supply the first heater member from the electrical energy source as long as the measurement related to the actual state of charge of the first electrical energy storage device is below a predetermined level of discharge and as long as the cut-off instruction has not been received.

Thus, when no cut-off instruction is received from the supervision module (for example when the latter is unavailable or faulty), a default operating mode may be implemented, improving the general operation of the micro-grid and its resistance to equipment failures.

According to a particular embodiment, the first communication module is configured to, upon receipt of a recharging instruction, ensure the recharging of the first electrical energy storage device from the electric power source, while the second communication module is configured so as to transmit, upon receipt of said recharging instruction destined for the first communication module, said recharging instruction to the first communication module, the supervision module being configured to check whether at least one recharging condition of the first electrical energy storage device is satisfied based on the first set of data and the second set of data, and when the recharging condition is satisfied, transmit to the second module communication said recharging instruction destined for the first communication module.

According to a particular embodiment, said at least one recharging condition of the first electrical energy storage device includes a condition according to which the measurement related to the actual state of charge of the first electrical energy storage device is below a predetermined charge threshold value of the first electrical energy storage device as a function of at least one data of the data from the first set of data and at least one data of the data from the second set of data.

Thus, the supervision module may emit recharging instructions optimized for heating appliances of the micro-grid, taking into account data specific to each of the heating appliances (such as its electrical consumption, production capacities, state of charge) and data related to the electric power source (current total consumption, current production, fee scheduling, etc.). It is possible to take into account not only the specific features of the first heating appliance, such as the technology of the electrical energy storage device or its state of charge, but also to dynamically adapt this threshold value as a function of constraints external to the first heating appliance, such as constraints related to the electrical power source.

According to a particular embodiment, in which the first heating appliance is configured so as to power the first heater member from the first electrical energy storage device as long as the measurement related to the actual state of charge of the first electrical energy storage device is above a predetermined level of charge and as long as the charging instruction is not received.

Thus, when no charging instruction is received from the supervision module (for example when the latter is unavailable or faulty), a default operating mode may be implemented, improving the general operation of the micro-grid and its resistance to equipment failures.

According to a particular embodiment, the first set of data includes at least one data of the data chosen from the following list: an information item making it possible to identify the first heating appliance on the micro-grid, a measurement of the power consumed by the first heating appliance, a measurement of the temperature of the environment of the first heating appliance, a temperature setpoint, an information item related to the presence or absence of a user.

In particular, it is possible to take into account the information related to the environment of the heating appliances of the micro-grid (for example the ambient temperature and the temperature setpoint), and to optimize the management of energy on the electrical grid accordingly.

According to a particular embodiment, the second module of communication is configured to communicate with the supervision module by means of a first access point accessible via the micro-grid, and the second communication module is configured to communicate with the supervision module by means of a first back-up access point accessible via the micro-grid, when the first access point does not make it possible to establish a functional connection with the supervision module.

By having a first backup access point, it is possible to improve the general operation of the micro-grid and its resistance to equipment failures, by having another access in case of unavailability of the first point access, and guarantee the continuity of exchanges with the supervision module.

According to a particular embodiment, the second communication module is adapted, by means of a second access point accessible via the micro-grid, to receive data from a communicating smart electric meter deployed on the electric power source, the second set of data including at least one data related to the electric power source obtained from the smart electric meter.

Thus, by having access to the information made available by the smart electric meter deployed on the electrical grid, the supervision module may take advantage of these information thus collected to emit optimized cut-off instructions to the heating appliances of the micro-grid, taking into account dynamic data, specific to the electrical grid and/or to the site.

According to a particular embodiment, the second communication module is adapted, by means of a third access point accessible via the micro-grid, to receive data from an electricity-producing device coupled to the electric power source and/or from an electricity-consuming device powered by the electric power source, the second set data including at least one data related to the production device and/or at least one data related to the consuming device.

It is thus possible to integrate into the optimized management means of the disclosure, data related to production devices (such as solar panels or energy reserves) and to consuming devices coupled to the electrical grid, other than the heating appliances of the micro-grid, and likely to have a significant impact on the energy available in the electrical grid. Taking this information into account therefore makes it possible to improve the efficiency of charge or cut-off instruction transmissions, and therefore to further improve the overall energy management of the micro-grid, taking into account already installed third-party equipments.

According to a particular embodiment, the second communication module is configured to record the first set of data and/or the second set of data, when the transmission of the first set of data and/or of the second set of data to the supervision module is not possible, the second communication module being configured to transmit the first set of data as recorded and/or the second set of data as recorded, once the possibility of transmitting the first set of data and/or the second set of data to the supervision module has been restored.

By providing a degraded management mode in the event of failure of the supervision module or the means of communication allowing data to be transmitted to the supervision module, it is possible to subsequently transmit all the collected data, and thus not to lose significant historical data for emitting charge or cut-off instructions. The reliability of energy management is therefore improved as well as the resistance of the micro-grid to equipment failures.

According to a particular embodiment, the micro-grid further includes a third heating appliance provided with a third communication module configured to communicate with the supervision module by means of a secondary access point accessible via the micro-grid, the second communication module being configured to transmit to the third communication module the first set of data and the second set of data, when the second communication module cannot transmit the first set of data and the second set of data to the supervision module, the third communication module being configured so as to:
  obtain, and transmit to the supervision module by means of the secondary access point, the first set of data and the second set of data,
  transmit, upon receipt of the cut-off instruction destined for the first communication module by means of the secondary access point, said cut-off instruction to the first communication module.

By providing such a switchover mechanism to the third communication module in the event of unavailability of the communication means of the second communication module to the management mode, it is possible to immediately transmit all the collected data, and thus not to lose any significant data for the transmission of the charge or cut-off instructions. The availability of energy management is therefore improved as well as the resistance of the micro-grid to equipment failures.

According to a second aspect, there is also suggested an electrical installation comprising at least one such micro-grid, said at least one first heating appliance of which is electrically connected to an electric power supply source delivering a direct electric voltage and comprising all or part of the following elements: photovoltaic panels, a fuel cell, a supercapacitor, an electrochemical cells assembly-based battery, a wind turbine.

BRIEF DESCRIPTION OF THE DRAWINGS

The disclosure will be better understood using the following description of particular embodiments of the disclosure provided as non-limiting examples and represented in the appended drawings, in which.

DETAILED DESCRIPTION OF THE DRAWINGS

Figure 1:
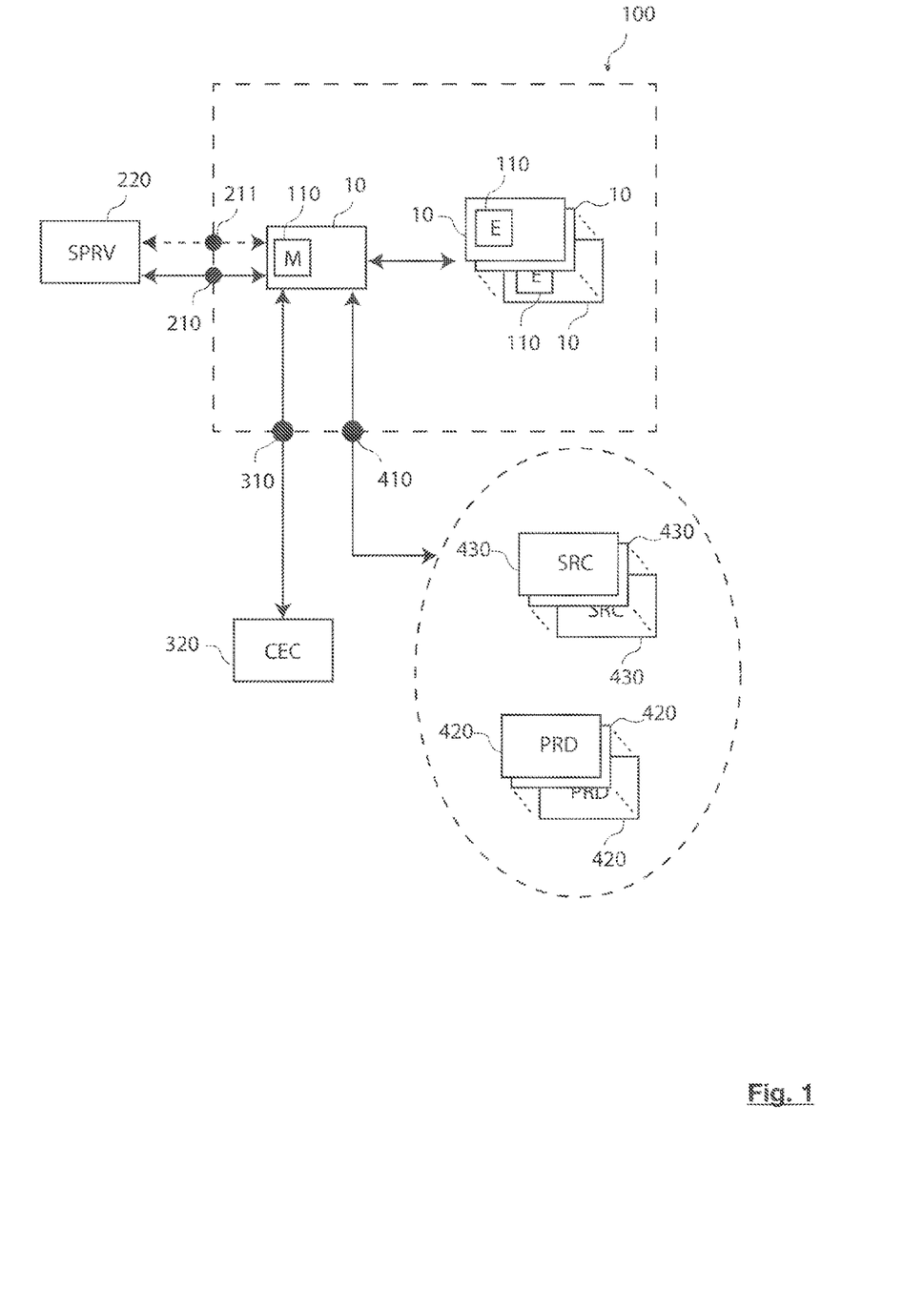
FIG. 1 is a schematic view of a micro-grid comprising a plurality of electrical radiator type heating appliances, adapted to be coupled to an electric power supply source and each provided with an electrical energy storage device, according to a first topology.

Reference is made to FIG. 1 in which a micro-grid 100 comprising a plurality of electrical radiator type heating appliances 10, is represented. Each heating appliance 10 is adapted to be coupled to an electric power supply source marked 13 in FIG. 3. As will be detailed later on, the electric power supply source 13 may include an electrical grid delivering an alternating voltage and/or supply elements delivering a direct voltage. Each of the electrical appliances 10 is equipped with an electrical energy storage device 15 adapted to be electrically recharged from the electric power supply source 13. Each heating appliance 10 of the micro-grid 100 is in particular adapted to measure, preferably in real time, the electric power that it consumes and that it produces, that is to say that it is capable of releasing. More specifically, each heating appliance 10 of the micro-grid 100 is able to establish, by direct measurement or determination:
  a measurement related to a power consumption of this heating appliance 10 where this power consumption of this heating appliance 10 is defined as being an amount of electric power transmitted to this heating appliance 10 by the electric power source,
  at least one measurement related to an power production of this heating appliance 10 where this power production of this heating appliance 10 is defined as being an amount of electric power consumed by this heating appliance 10 from its electrical energy storage device,
  and at least one measurement related to an actual state of charge of its electrical energy storage device 15.

Advantageously, the plurality of heating appliances 10 includes heating appliances 10 as described in patent applications EP-A1-3384727 or FR-A1-3059199.

Each heating appliance 10 comprises a communication module 110 adapted to allow access to a grid such as the micro-grid 100. The communication module 110 allows in particular the heating appliance 10 to which it is coupled, to identify itself on the micro-grid 100, to transmit data to other heating appliances 10 that have joined the micro-grid 100, and to receive data sent by other heating appliances 10 that have joined the micro-grid 100. The communication module 110 may be configured to allow the establishment of data connections using radio waves and to allow joining the micro-grid 100 when the latter comprises a wireless network, for example by implementing one or several wireless communication protocol(s) governed by the standards of the IEEE 802.11 group (ISO/IEC 8802-11), and designated by the acronym Wi-Fi. The communication module 110 may also be configured to allow the establishment of wired data links and to make it possible to join the micro-grid 100 when the latter comprises a wired network, for example by implementing one or several communication protocol(s) adapted to the use of power line carriers (commonly designated by the abbreviation PLC) to establish a computer network on the local electrical grid of a site.

Each communication module 110 is configured to operate in a master mode and in a slave mode. Each communication module 110 operates exclusively at a given time point according to only one of these two modes, namely either the master mode or the slave mode. Each communication module 110 can be reconfigured, preferably by a standard configuration operation by means of an appropriate user interface, to operate in the other mode.

Figure 2:
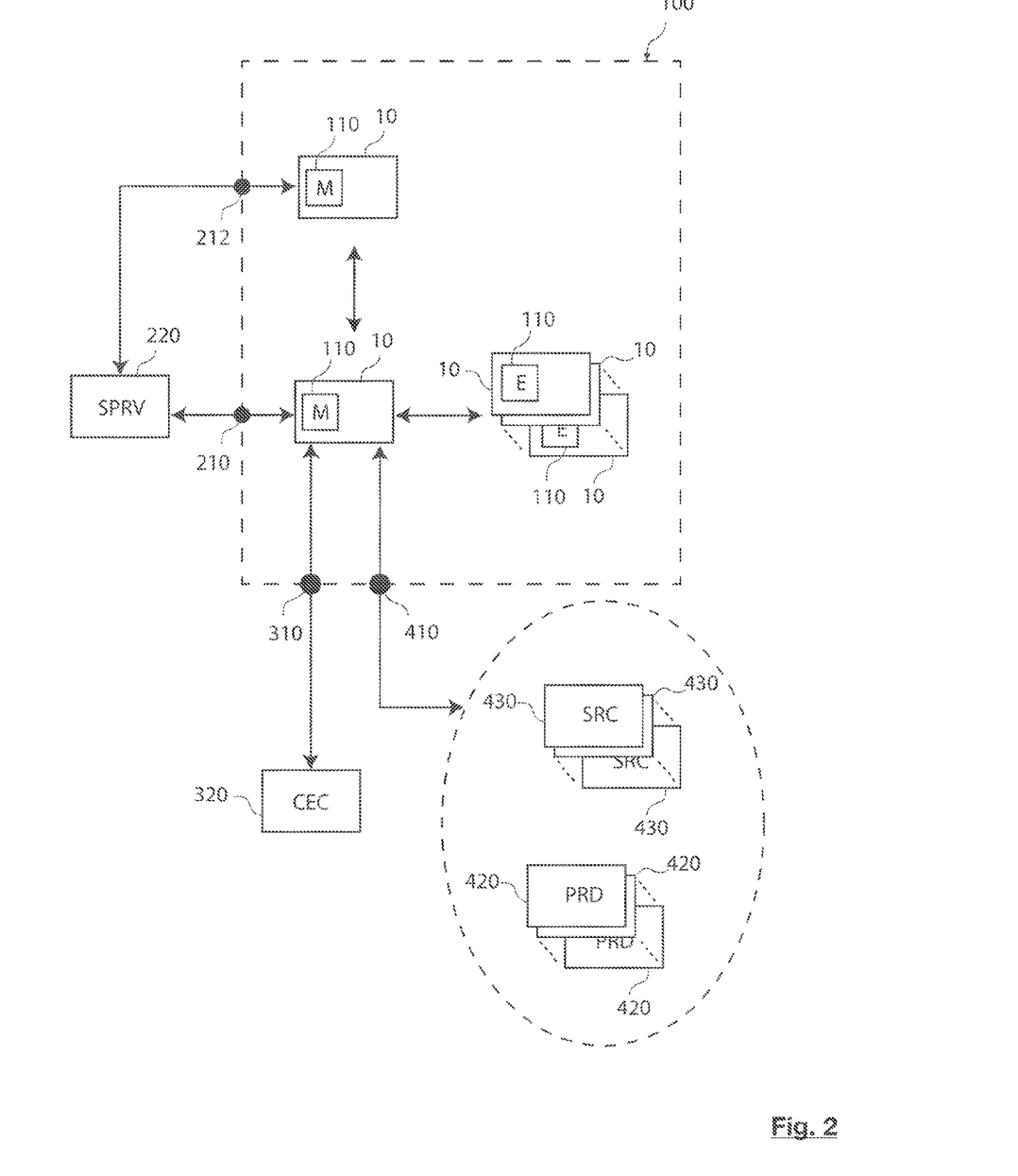
FIG. 2 is a schematic view of a micro-grid comprising a plurality of electrical radiator type heating appliances, adapted to be coupled to an electric power source and each provided with an electrical energy storage device, according to a second topology.

According to the topology, the micro-grid 100 may include either a single communication module 110 operating in master mode, the other communication modules operating in slave mode (an example of such a topology being illustrated by FIG. 1), or alternatively a plurality of communication modules 110 operating in master mode, the other communication modules operating in slave mode (an example of such a topology being illustrated by FIG. 2). Furthermore, for the sake of conciseness, in FIGS. 1 and 2, a single micro-grid 100 is represented. Of course, it is possible, in particular for sites including a great number of heating appliances 10 or even having topographical specificities such as a large area or even particular security constraints, to bring together a plurality of micro-grids 100 including heating appliances 10 coupled to the same power grid.

In the example of FIG. 1, one of the communication modules 110 is configured to operate in master mode on the micro-grid 100, the latter is identified in FIG. 1 by the letter "M". The other communication modules 110 are configured to operate in slave mode, and identified in FIG. 1 by the letter "E".

In slave mode, each communication module 110 is configured to collect a set of information related to the state, the environment and the capacities of the heating appliance 10 to which said communication module 110 is coupled, in particular one or several information item(s) from the following non-exhaustive list:

- an information item such as a unique identifier making it possible to identify on the micro-grid 100 the heating appliance 10 equipped with the communication module 110;
- a measurement of the power consumed by the heating appliance 10;
- a measurement of the power produced by the heating appliance 10, that is to say the power released from its electrical energy storage device;
- a state of charge of the electrical energy storage device of the heating appliance 10;
- a measurement of the temperature of the environment of the heating appliance
- a temperature setpoint;
- an information item related to the presence or absence of a user.

In master mode or in slave mode, each communication module 110 is also configured to transmit at least said measurement related to the power consumption of the heating appliance 10 coupled to the communication module 110 (for example an instantaneous consumed power or a power consumed over a determined time period from the power supply source 13), and at least one measurement of said power production of the heating appliance 10 coupled to the communication module 110 (for example an instantaneous produced power or a power produced over a determined time period by electric discharge from the electrical energy storage device 15). The collection and/or transmission of all or part of the set of information related to the state, the environment and the capacities of the heating appliance 10 to which the communication module 110 is advantageously carried out in real time, that is to say at time intervals adapted to the monitoring of said information and to its processing.

The communication module 110 is configured, in master mode, to receive the measurement related to the power consumption and the measurement related to the power production associated with each heating appliance of the micro-grid 100, as well as the other information collected and transmitted by the communication module(s) 110 operating in slave mode.

The communication module 110 is adapted, in master mode, by means of a second access point 310 accessible via the micro-grid 100, to receive data from a smart electric meter 320, deployed on the electrical grid to which the heating appliances 10 of the micro-grid 100 are coupled. The communication module 110 may for example ensure, in master mode, that the smart electric meter 320 is indeed attached to the electrical grid powering the heating appliances 10 of the micro-grid 100 by means of an identifier specific to the smart electric meter 320, accessible by means of the second access point. For example, the communication module 110 may compare a grid address or a unique identifier specific to the smart electric meter 320, to a list of unique identifiers and/or addresses accepted by the micro-grid 100 or to a diagram to which must respond with the unique identifiers and/or addresses accepted by the micro-grid 100. The communication module 110 may be configured to access the second access point 310 by establishing a wireless communication link, for example by implementing one or several wireless communication protocol(s) and/or by establishing a wired communication link, for example by implementing one or several communication protocol(s) adapted to the use of power line carriers to establish a computer network on the local electrical grid of a site. The second access point 310 is for example a device adapted to allow the establishment of communication with the smart electric meter 320. Depending on the type of smart electric meter 320, the second access point 310 is for example a wireless access point, or a gateway to access a grid to which the smart electric meter 320 is coupled.

The communication module 110 is configured, in master mode, to collect, preferably in less than a few seconds, by means of the second access point 310, a set of information provided by the smart electric meter 320, related to the electrical grid to which are coupled the heating appliances 10 of the micro-grid 100, in particular one or several information item(s) from the following non-exhaustive list: an information item related to the power provided and/or consumed on the electrical grid, a power measurement, an information item on a contract power, fee schedule, etc.

The communication module 110 comprises, in master mode, a processing unit adapted to enable the processing, filtering and aggregation of the data received from the heating appliances 10, from the smart electric meter 320, as well as from its own information and data (in particular, its own power consumption and/or its own power production and data related to its environment and state) to produce a consolidated set of local data.

The communication module 110 is adapted, in master mode, by means of a first access point 210 accessible via the micro-grid 100, to transmit data to a supervision module 220 and to receive data from the supervision module 220. The communication module 110 may ensure for example, in master mode, that the supervision module 220 and/or the first access point 210 are legitimate to receive information relating, in particular, to the heating appliances 10 of the micro-grid 100 by means of an identifier specific to the supervision module 220 and/or to the first access point 210. For example, the communication module 110 may compare a grid address or a unique identifier specific to the supervision module 220 and/or to the first access point 210, to a list of unique identifiers and/or addresses accepted by the micro grid 100 or to a scheme to which the unique identifiers and/or addresses accepted by the micro grid 100 must respond. The communication module 110 is, in master mode, in particular adapted by means of a first access point 210 accessible via the micro-grid 100, to transmit the set of consolidated local data to the supervision module 220. The communication module 110 may be configured to access the first access point 210 by establishing a wireless communication link, for example by implementing one or several wireless communication protocol(s) governed by the standards of the IEEE 802.11 group (ISO/IEC 8802-11) and/or by establishing a wired communication link, for example by implementing one or several communication protocol(s) adapted to the use of power line carriers to establish a computer network on the local electrical grid of a site. The first access point 210 is for example a device adapted to allow the establishment of two-way communication with the supervision module 220. Depending on the nature of the supervision module 220, the first access point 210 is for example an access point to the Internet such as a home gateway of an Internet service provider, a router for accessing a network to which the supervision module 220 is coupled, an electrical interface coupled to the supervision module 220.

Advantageously, the communication module 110 may also, in master mode, be adapted, by means of a first backup access point 211 accessible via the micro-grid 100, to transmit data to the supervision module 220 and to receive data from the supervision module 220, when the first access point 210 makes it impossible to establish a functional connection with the supervision module 220. The first backup access point 211 is for example a device, adapted to allow the establishment of two-way communication with the supervision module 220, of the gateway type to a mobile telephone network.

Advantageously, the communication module 110 may be also adapted, in master mode, to store data that cannot be transmitted to the supervision module 220, when the first access point 210 makes it impossible to establish a functional connection with the supervision module. 220, and to transmit the data thus stored when the first access point 210 makes it possible to establish a functional connection with the supervision module 220 once again.

The supervision module 220 is typically deployed on a site remote from that in which the micro-grid 100 is installed. The supervision module 220 may be included in a server type computer system. Alternatively, the module supervision 220 may be deployed in at least one equipment installed on the site hosting the micro-grid 100, for example in at least one of the heating appliances 10.

In one embodiment, each communication module 110 is configured to determine its belonging to the micro-grid 100 by means of an identifier specific to the heating appliance 10 with which said communication module 110 is coupled or a sub-component of the latter such as a component of the electrical energy storage device 15. For example, the communication module 110 may compare a grid address or a unique identifier specific to the heating appliance 10 with which said communication module 110 is coupled, to a list of unique identifiers and/or addresses accepted by the micro grid 100 or to a scheme to which the unique identifiers and/or addresses accepted by the micro-grid 100 must respond.

In one embodiment, the communication module 110 is adapted, in master mode, by means of a third access point 410 accessible via the micro-grid 100, to obtain the electrical production produced by at least one electricity-producing device 420 coupled to the electrical grid powering the heating appliances and/or to obtain the electrical power consumed by at least one electricity-consuming device 430 coupled to the electrical grid powering the heating appliances 10. The communication module 110 may also be adapted, in mode master, by means of the third access point 410, to collect a set of information related to the state, the environment and the capacities of said at least one production device 420 and/or of said at least one consuming device 430.

Each communication module 110 is thus configured to transmit the electrical power that it consumes and that it produces as well as the collected information to one or several communication module(s) 110 operating in master mode. The collection and/or transmission of all or part of the set of information related to the state, the environment and the capacities of the heating appliance 10 to which the communication module 110 is advantageously carried out in real time, that is to say at time intervals adapted to the monitoring of said information and to its processing.

Typically, the production device 420 and/or the consuming device 430 are installed on the site hosting the micro-grid 100, and coupled to the same electrical grid as the smart electric meter 320. The production device 420 may for example be an electric vehicle charging station, a common heating system provided with a power source, a photovoltaic production system, etc. The consuming device 430 is an electrical grid powered device.

The communication module 110 is adapted, in master mode, to collect in particular one or several information item(s) from the following non-exhaustive list, related to said at least one production device 420 and/or to said at least one consuming device 430:
- an information item such as a unique identifier allowing to identify the production device 420 and/or the consuming device 430;
- a measurement of the active power related to the production device 420 and/or the consuming device 430;
- a state of charge of one or several energy storage source(s) of the production device 420;
- a measurement related to the environment of the production device 420 and/or consuming device 430;
- an information item related to the presence or absence of a user; etc.

Thus, the supervision module 220 has the set of consolidated local data transmitted by the communication module 110 in master mode, relating in particular to the heating appliances 10 of the micro-grid 100, to the electrical grid of the site as received from the smart electric meter 320, and possibly from the consuming devices 430 and/or production devices 420.

The supervision module 220 may further be configured to obtain a set of global data related to the electrical grid and/or to the manager of the electrical grid, in particular information on the management aspects of the electricity supply service, the actual state and/or the capacities of the electrical grid on a scale greater than that of the site in which the micro-grid 100 is located, the availability and the load of the electrical grid, etc.

Figure 3:
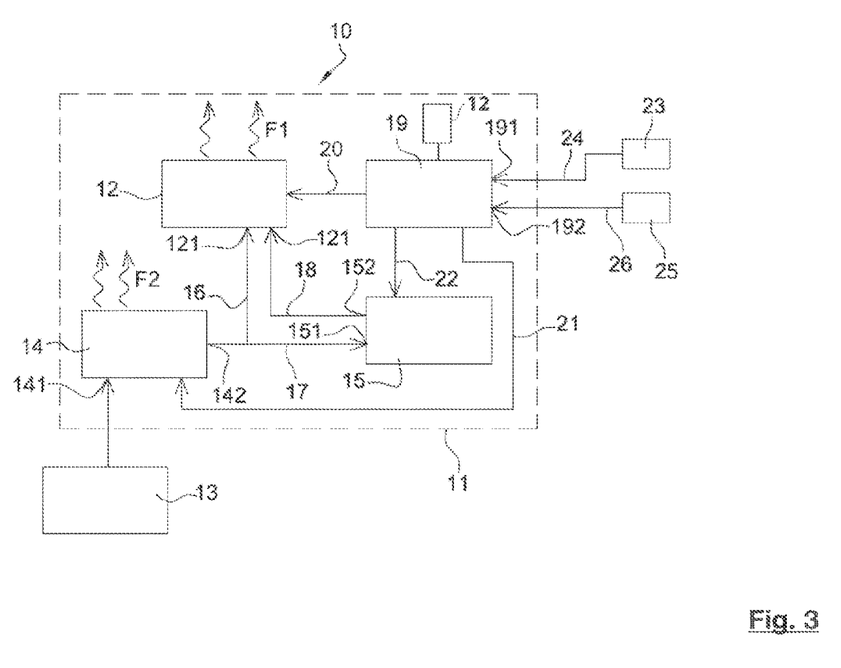
FIG. 3 is a schematic view of the components of an example of heating appliance usable in each of the micro-grids of FIGS. 1 and 2.

The supervision module 220 is configured to transmit to the communication module 110, in master mode, a first state of charge setpoint related to a target state of charge required for the electrical energy storage device 15 of each of the heating appliances 10 associated with communication modules 110 in slave mode. The communication module 110 is adapted, in master mode, to receive, process and then transmit these first setpoints to the communication modules 110 in slave mode. Each communication module 110 then controls, in slave mode, the power supply of the heater member 12 of the heating appliance 10 with which it is associated from its electrical energy storage device 15 and/or from the electric power supply source 13, taking into account the first received state of charge setpoint as well as the measurement related to the actual state of charge.

When the heating appliance 10 to which is associated the communication module 110 adopting the master mode is provided with an electrical energy storage device 15, at least one heater member 12 adapted to be powered from the electric power supply source 13 and/or from its electrical energy storage device 15, the supervision module 220 is configured so as to transmit to the communication module 110 in master mode a second state of charge setpoint related to the target state of charge of the electrical energy storage device 15 of this heating appliance 10. The communication module 110 is configured so as to receive this second state of charge setpoint transmitted by the supervision module 220 and to control the power supply of the heater member 12 of the heating appliance 10 from the electrical energy storage device 15 of the second heating appliance 10 and/or from the electric power supply source 13 taking into account said second state of charge setpoint and the measurement related to the actual state of charge.

The supervision module 220 is further configured to send, by means of the communication module 110, in master mode, to one or several heating appliance(s) of the micro-grid 100, one or several cut-off instruction(s), when at least one cut-off condition is satisfied in the set of consolidated local data and, optionally in the set of global data related to the electrical grid and/or to the manager of the electrical grid.

A cut-off condition may in particular correspond to the fact, for at least one of the heating appliances 10 of the micro-grid 100, of being equal to or passing above a predetermined charge threshold value of the electrical energy storage device 15 of said at least one heating appliance 10.

In one embodiment, the supervision module 220 may also be configured to send, by means of the communication module 110 in master mode, to one or several heating appliance(s) 10 of the micro-grid 100, one or several battery charging instruction(s), when at least one charging condition is satisfied in the set of consolidated local data and, optionally in the set of global data related to the electrical grid and/or to the electrical grid manager.

A recharging condition may in particular correspond to the fact, for at least one of the heating appliances 10 of the micro-grid 100, of being equal to or falling below a predetermined charge threshold value of the electrical energy storage device 15 of said at least one heating appliance 10.

Both for the cut-off condition and for the recharging condition, the predetermined charge threshold and the predetermined charge value may respectively be preconfigured, for example according to the capacities and technical characteristics of the heating appliances 10 and of their electrical energy storage device 15. Thus, it is possible to set the predetermined charge threshold and/or the predetermined charge value as a function of the total capacity, for example at a value equal to 80%. Thus, when the electrical energy storage device of one of the heating appliances 10 of the micro-grid presents a measurement related to the actual state of charge greater than 80%, the supervision module 220 sends, to said heating appliance 10, a cut-off instruction. Said heating appliance 10 then ceases to use as a power source the electricity provided by the electric power source 13 and uses the power released by its electrical energy storage device 15. Alternatively, when the electrical energy storage device 15 of one of the heating appliances 10 of the micro-grid presents a measurement related to the measured state of charge lower than the predetermined level of discharge, which is for example equal to 30%, the supervision module 220 may send, to said heating appliance 10, a charging instruction. Said heating appliance 10 then ceases to use the electrical energy released by the electrical energy storage device 15 and uses the energy provided by the electric power supply source 13.

Both for the cut-off condition and for the recharging condition, the predetermined charging threshold and the predetermined charging threshold value may respectively be dynamic and each established as a function of one data or several data included in the set of consolidated local data and, optionally in the set of global data related to the electrical grid and/or to the manager of the electrical grid. Thus, the predetermined charge threshold and the predetermined charge threshold value may each be a function of data related to the electrical consumption of the site on which the heating appliances 10 of the micro-grid 100 are deployed, and/or of the availability of the production device 420, and/or the electrical consumption on the off-site electrical grid. For example, it is possible to set the predetermined charge threshold and/or the predetermined charge threshold value at 80% when the electrical consumption of the site is lower than a predefined level, and at 20% when the electrical consumption of the site is higher or equal to the same predefined level. The predetermined charge threshold and/or the predetermined charge threshold value may also be a function of data related to the current temperature of the site on which the heating appliances 10 of the micro-grid 100 are deployed, and/or to information on the habits of the users of the heating appliances 10. For example, it is possible to set the predetermined charge threshold and/or the predetermined charge threshold value proportionally to the current temperature of the site, and to reduce it by half from over a daily period during which the user usually sets a temperature setpoint higher than that of the other daily periods. The predetermined charge threshold and/or the predetermined charge threshold value may also be a function of data related to the thermal inertia of the building accommodating the heating appliances 10. The predetermined charge threshold and/or the predetermined charge threshold value may also depend on data related to the total production capacity on the site.

The communication module 110 is configured, in master mode, to receive, and transmit to the concerned heating appliances 10, the cut-off instructions and/or the charging instructions, transmitted by the supervision module 220 via the second access point 310.

The communication module 110 is further configured to transmit the received cut-off instructions and/or charging instructions to the various members and components of the heating appliance 10 coupled to said communication module 110 adapted to execute or carry out the received cut-off instructions and/or charging instructions.

Advantageously, each heating appliance 10 may be configured so as to stop using as an energy source the electricity provided by the electric power supply source and to use the electricity released by its own electrical energy storage device 15, when the measurement related to the actual state of charge of the electrical energy storage device 15 is or becomes greater than a predetermined level of charge and as long as the charging instruction has not been received. Each heating appliance 10 may also be configured to stop using the electricity provided by its own electrical energy storage device 15 as an energy source and to use the electricity provided by the electric power supply source 13, when the measurement related to the actual state of charge of the electrical energy storage device 15 is below the predetermined level of discharge, and as long as a cut-off instruction is not received. Thus, in the event that the connection between one or several heating appliance(s) 10 and the supervision module 220 is temporarily lost, the heating appliances 10 may apply a standard policy for cut-off and charge management An alternative topology for the micro-grid 100 is represented in FIG. 2, in which two communication modules 110 operate in master mode, one of which is coupled to the supervisor module 220 by means of a first secondary access point 212. The first secondary access point 212 is for example a device adapted to allow the establishment of two-way communication with the supervision module 220, of the gateway type to a mobile telephone network.

In one embodiment, if one of the communication modules 110 no longer has, in master mode, a functional connection to the supervision module 220, then the latter is configured to transfer the data to be transmitted to the supervision module 220 to one of the communication modules 110 having, in master mode, a functional connection with the supervision module 220, so that the latter transmits said data to the supervision module 220.

In one embodiment, represented in FIG. 3, each electrical radiator type heating appliance 10 comprises a case 11 housing a heater member 110 producing a first flow of calories F1 when an input 121 of the heater member 12 is powered by an electric direct voltage.

The heater member 12 may in particular comprise at least one radiating body and/or at least one heating device by a heat transfer fluid.

The heating appliance 10 comprises a voltage converter 14 implanted in the case 11 and comprising an input 141 provided with connection elements allowing electrically connecting the voltage converter 14 to the electric power supply source 13 and an output 142 delivering a direct electric voltage adapted to directly or indirectly power the input 121 of the heater member 12. The voltage converter 14 allows transforming the input current coming from the electric power supply source 13 into a direct output current directly usable in this form by the components that the voltage converter 14 is intended to supply with energy.

The nature of the voltage converter 14 is directly related to that of the electric power supply source 13 to which it is intended to be connected. In particular, the voltage converter 14 may be configured so as to be able to deliver, at its output 142, the direct electric voltage by converting a direct electric voltage applied to the input 141 of the voltage converter 14 by the electric power supply source 13 when the voltage converter 14 is connected thereto. Thus, if the electric power supply source 13 is of the type delivering a direct electrical voltage, then the voltage converter 14 may be of the DC/DC type. Alternatively, it is nonetheless still possible that the voltage converter 14 is configured so as to be able to deliver, at its output 142, the direct electric voltage by converting an alternating electric voltage applied to the input 141 of the voltage converter 14 by the electric power supply source 13 when the voltage converter 14 is connected thereto. Thus, if the electric power supply source 13 is of the type delivering an alternating electric voltage, then the voltage converter 14 may be of the AC/DC type.

The voltage converter 14 may for example comprise a switched-mode power supply or several switched-mode power supplies in parallel, or more simply at least one chopper, in order to enable the conversion of an alternating current into a direct current directly usable by the components that the output 142 of the voltage converter 14 is intended to supply with electrical energy.

The heating appliance 10 typically comprises the electrical energy storage device 15 operating under a direct electric current, having an input 151 intended to be supplied by a direct current and an output 152 delivering another direct current. The storage device 15 allows storing the energy used by the heating appliance 10, with a view to spacing the consumption of electricity over time. It makes it possible in particular to store electrical energy when the latter is available, in particular when the cost of obtaining it is deemed to be economical.

As example, the electrical energy storage device 15 comprises an electrochemical cells assembly-based battery and/or a supercapacitor.

Moreover, in order to be able to achieve a direct supply of the heater member 12 with electrical energy through the output 142 of the voltage converter 14, the heating appliance 10 comprises first connecting elements 16 for connecting the output 142 of the voltage converter 14 with the input 121 of the heater member 12 and adapted to apply the direct electric voltage delivered at the output 142 of the voltage converter 14 to the input 121 of the heater member 12 in parallel, in order to be able to provide an indirect supply of the heater member 12 with electrical energy through the output 142 of the voltage converter 14, the heating appliance 10 comprises second connecting elements 17 for connecting the output 142 of the voltage converter 14 with the input 151 of the electrical energy storage device 15 and adapted to apply the direct electrical voltage delivered at output 142 of the voltage converter 14 to the input 151 of the electrical energy storage device 15. Complementarily, the heating appliance 10 comprises third connecting elements 18 for connecting the output 152 of the electrical energy storage device 15 with the input 121 of the heater member 12 and adapted to apply the direct electrical voltage delivered to the output 152 of the electrical energy storage device 15 at the input 121 of the heater member 12.

The nature of the first connecting elements 16, the second connecting elements 17 and the third connecting elements 18 is not limiting in itself since it enables them to be adapted to the functions assigned to them and which have been presented hereinbefore.

Furthermore, the heating appliance 10 comprises switch elements (not represented as such) for varying the first connecting elements 16 between an open circuit or closed circuit configuration, for varying the second connecting elements 17 between an open circuit or closed circuit configuration, and for varying the third connecting elements 18 between an open circuit or closed circuit configuration.

The heating appliance 10 also comprises a management unit 19 housed within the case 11, communicating with the communication module 110 of this appliance 10, and controlling at least the heater member 12 via the control (wired or wireless) connections 20 and the switch elements mentioned in the previous paragraph.

The management unit 19 may also control the voltage converter 14 via the control (wired or wireless) connections 21 and/or the control of the electrical energy storage device 15 via the control (wired or wireless) connections 22 (wired or no).

The management unit 19 may also ensure the control of the voltage converter 14 via the control (wired or wireless) connections 21 and/or the control of the electrical energy storage device 15 via the control (wired or wireless) connections.

In particular, the management unit 19 ensures a control of the voltage converter 14 such that the direct electric voltage delivered at the output 142 of the voltage converter 14 varies according to the power to be delivered by the heater member 12 calculated by the management unit 19. In particular, such a control strategy will be considered and facilitated when the voltage converter 14 comprises a plurality of switched-mode power supplies in parallel. It is therefore possible to vary the power delivered by the heater member 12 in a simple and economical way, without resorting to a complex electronic solution.

Thus, the direct voltage delivered by the voltage converter 14 is dependent on the voltage required for the heater member 12 or for the storage device 15.

The use of a voltage converter 14 of the switched-mode supply or chopper type also allows avoiding redundancy between the direct current supplies of the different electronic components incorporated in the heating appliance 10 (control map, sensors, display, etc. . . . ). On the contrary, the voltage converter 14 allows powering with direct current all electronic components. The result is a simplicity of design, a limited cost, a better robustness.

It goes without saying that the output 142 of the voltage converter 14 is also connected to an input of the management unit 19 in order to ensure the supply with electrical energy.

As represented in FIG. 3, the heating appliance 10 also comprises a measuring sensor 23 adapted to measure the temperature outside the case 11 and first transmission elements 24 allowing addressing the value determined by the measuring sensor 23 to a first input 191 of the management unit 19.

The heating appliance 10 also comprises a characterization element 25 allowing characterizing the state of charge of the electrical energy storage device 15 and second transmission elements 26 allowing addressing the value determined by the characterization element 25 to a second input 192 of the management unit 19.

Preferably, the management unit 19 ensures a control of the switch elements according to a predetermined strategy algorithm stored in a memory of the management unit 19, according to the value determined by the measuring sensor 23 and addressed to the first input 191 of the management unit 191 via the first transmission elements 24 and according to the value determined by the characterization element 25 and addressed to the second input 192 of the management unit 19 via the second transmission elements 26.

The strategy algorithm allows choosing the best conditions for choosing the operation of the heater member 12, the direct charging of the storage device 15 with direct current or the discharge of the storage device 15 through the heater member 12 adapted for direct current.

According to a preferred embodiment, the management unit 19 makes the heating appliance 10 vary, by controlling the switch elements, between:
  a first operating mode where the first connecting elements 16 and/or the third connecting elements 18 occupy an open circuit configuration, the first operating mode being occupied if the difference between the value determined by the measuring sensor 23 and a setpoint temperature known to the management unit 19 is higher than a strictly positive predetermined first deviation,
  and a second operating mode where the first connecting elements 16 and/or the third connecting elements 18 occupy a closed circuit configuration, the second operating mode being occupied if the difference between the value determined by the measuring sensor 23 and the setpoint temperature known to the management unit 19 is lower than a predetermined second deviation less than or equal to zero.

The value of the predetermined first deviation is typically comprised between 1 and 3°, for example equal to 2°. Thus, in the latter example, the first operating mode is adopted if the temperature measured by the temperature sensor 23 is at least two degrees higher than the setpoint temperature, which has the effect of stopping the operation of the heater member 12.

The value of the predetermined second deviation is typically comprised between −1 and 0, for example equal to 0. Thus, in the latter example, the second operating mode is adopted if the temperature measured by the temperature sensor 23 is lower than or equal to the setpoint temperature, which has the effect of starting heating of the room by the heater member 12.

Moreover, parallel to these control strategies already described in connection with the first and second operating modes, the management unit 19 makes the heating appliance 10 vary, by controlling the switch elements, between:
  a third operating mode where the second connecting elements 17 occupy a closed circuit configuration, the third operating mode being occupied if the value determined by the characterization element 25 is lower than or equal to a predetermined first threshold known to the management unit 19,
  and a fourth operating mode where the second connecting elements 17 occupy an open circuit configuration, the fourth operating mode being occupied as soon as the value determined by the characterization element 25 is higher than or equal to a predetermined second threshold known to the management unit 19 and strictly higher than the predetermined first threshold.

Parallel to these control strategies already described in connection with the first, second, third and fourth operating modes, the management unit 19 makes the heating appliance 10 occupy, by controlling the switch elements, a fifth operating mode where the third connecting elements 18 occupy a closed circuit configuration if the value determined by the characterization element 25 is higher than or equal to a predetermined third threshold known to the management unit 19. In particular, the predetermined third threshold is comprised between the predetermined first threshold and the predetermined second threshold.

Typically, the predetermined first threshold is for example equal to 0.15. Thus, the third operating mode is adopted if the state of charge of the storage device 15 is less than 15%, which has the effect of starting the charging of the storage device 15 in order to avoid an excessive discharge likely to degrade the storage device 15. Alternatively or in combination with the foregoing, the adoption of the third operating mode may possibly be conditioned by the presence of inexpensive energy from the source 13.

In turn, the predetermined second threshold is typically greater than 0.9, for example equal to 0.95. Thus, the fourth operating mode is adopted if the state of charge of the storage device 15 is greater than 95%, which has the effect of stopping the charging of the storage device 15 in order to avoid an excessive charging and a premature wear.

In turn, the predetermined third threshold is typically comprised between 0.4 and for example equal to 0.5. Thus, the fifth operating mode is adopted if the state of charge of the storage device 15 is greater than 50% for example, which has the effect of starting the electric power supply of the heater member 12 from the storage device 15. Alternatively, or in combination with the foregoing, the adoption of the fifth mode operation may possibly be conditioned by the absence of inexpensive energy from the source 13.

The reader should understand that the use of the terms «first operating mode», «second operating mode», «third operating mode», «fourth operating mode» and «fifth operating mode» does not confer to them any priority property of one relative to the other and any exclusion property of one relative to the other. On the contrary, it is quite possible to combine together different operating modes.

The term «state of charge» evokes a magnitude totally known to those skilled in the art. There are many ways to evaluate this state of charge, providing no limitation herein.

Advantageously, the voltage converter 14 comprises heat sinks producing a second flow of calories F2 with the calories generated by the voltage converter 14. The inner organization of the heating appliance 10 is such that the second flow F2 is mixed with the first flow of calories F1 generated by the heater member 12. The second flow F2 serves both to rapid preheating of the other components and, by mixing with the first flow F1, allows optimizing the energy efficiency of the electrical appliance 10 by avoiding the calories produced by the voltage converter 14 being lost or even annoying. In other words, the heat generated by the voltage converter 14 for transforming the input current into direct current is used for the heating of the components and the generation of heat by the appliance 10 to avoid yield losses.

Now, within the electrical installation, the connection elements of the input 141 of the voltage converter 14 are connected to the electric power supply source 13. Quite preferably, the electric power supply source 13 delivers a direct electric voltage and comprises all or part of the following elements: photovoltaic panels, a fuel cell, a supercapacitor, an electrochemical cells assembly-based battery. This allows optimizing the overall efficiency of the heating appliance 10 and of the electrical installation avoiding losses conventionally due to the conversions of an alternating current into a direct current. Furthermore, the heating appliance 10 is directly usable by power supply from a direct current source, which is a current trend in particular because of the development of renewable energies.

As an example that proved to be satisfactory, a so-called actual state of charge is measured indirectly from the following measurements, taken in a conventional manner by suitable and known sensors:

measurement of the voltage at the terminals of the electrical energy storage device 15 when the latter is a battery: a battery management system (otherwise known by "BMS") may be directly connected via cables to the positive and negative poles of the battery and measures its voltage in real time, measurement of the current: when the battery is charging (or discharging), a current passes through the battery management system and a shunt component is arranged on this battery management system and which makes it possible to measure the current.

To evaluate the state of charge, the BMS also relies on a predetermined abacus which associates the voltage with the table of state of charge, this abacus being known to the control unit 19. This abacus describes the state of charge of the battery according to its "idle" voltage, i.e. when the current is null. Thus, when the current is null, the BMS link the voltage of the battery to the so-called actual measured value of the state of charge found on the abacus (by interpolation) while when the current is not null, the BMS estimates the state of charge using a mathematical equation such as:

$$SOC(t) = SOC(t-1) + \int_0^t \frac{I}{C_{bat}} dt$$

where SOC(t) is the state of charge at time point t, in %
SOC(t−1) is the initial state of charge, in %
l is the charge and discharge current, in A
t is the time, in hours
$C_{bat}$ is the battery capacity, in Ah To establish the state of charge setpoint, whether in a discharge situation when the measurement related to the state of charge is greater than the charge threshold or in a charging situation when the measurement related to the state of charge is lower than the charge threshold, the state of charge setpoint may be translated into a power setpoint (which is a quantity of electrical energy divided by a time period), which itself will become null when the measurement related to the actual state of charge will have reached the state of charge setpoint.

The invention claimed is:

1. A micro-grid including at least:
   a first heating appliance comprising a first electrical energy storage device adapted to be recharged from an electric power supply source, at least one first heater member adapted to be powered from the electric power supply source and/or from the first electrical energy storage device, and a first communication module,
   a second heating appliance comprising a second electrical energy storage device adapted to be recharged from the electric power supply source, at least one second heater member adapted to be powered from the electric power supply source and/or from the second electrical energy storage device, and a second communication module, and
   a supervision module adapted to communicate at least with the second communication module,
   wherein:
   i) the first communication module is configured to:
   obtain, and transmit to the second communication module, a first set of data including:
      at least one measurement related to an electrical consumption of the first heating appliance where said electrical consumption of the first heating appliance is an amount of electric power transmitted to the first heating appliance by the electric power supply source,
      at least one measurement related to an electrical production of the first heating appliance where said electrical production of the first heating appliance is an amount of electric power consumed by the first heating appliance from the first electrical energy storage device,
      and at least one measurement related to an actual state of charge of the first electrical energy storage device,
      control the power supply of the first heater member from the first electrical energy storage device and/or from the electric power source taking into account the measurement related to the actual state of charge of the first electrical energy storage device and of a first state of charge setpoint related to a target state of charge of the first electrical energy storage device,
   ii) the second communication module is configured to:
      obtain, and transmit to the supervision module, the first set of data,
      obtain and transmit to the supervision module, a second set of data distinct from the first set of data, the second set of data including at least one data related to the electric power supply source and at least one measurement related to an actual state of charge of the second electrical energy storage device,
      receive from the supervision module, and transmit to the first communication module, said first state of charge setpoint,
      receive, from the supervision module, a second state of charge setpoint related to a target state of charge of the second electrical energy storage device, control the power supply of the second heater member from the second electrical energy storage device and/or from the electric power source taking into account the measurement related to the actual state of charge of the second electrical energy storage device and the second state of charge setpoint, iii) the supervision module is configured to:
receive the first set of data and the second set of data,
generate from the first set of data and the second set of data, and transmit to the second communication module, the first state of charge setpoint and the second state of charge setpoint.

2. The micro-grid according to claim 1, wherein the first communication module is configured to control the power supply of the first heater member from the first electrical energy storage device upon receipt of a cut-off instruction, wherein the second communication module is configured to transmit, upon receipt of the cut-off instruction destined for the first communication module, said cut-off instruction to the first communication module, and wherein the supervision module is configured to check whether at least one cut-off condition of the first heating appliance is satisfied based on the first set of data and on the second set of data, and when the cut-off condition is satisfied, transmit to the second communication module said cut-off instruction destined for the first communication module.

3. The micro-grid according to claim 2, wherein said at least one cut-off condition of the first heating appliance includes a condition according to which the measurement related to the actual state of charge of the first electrical energy storage device is above a predetermined threshold of charge of the first electrical energy storage device, depending on at least one of the data from the first set of data and on at least one of the data from the second set of data.

4. The micro-grid according to claim 2, wherein the first heating appliance is configured to power the first heater member from the electric power source as long as the measurement related to the actual state of charge of the first electrical energy storage device is below a predetermined level of discharge and as long as the cut-off instruction is not received.

5. The micro-grid according to claim 1, wherein:
the first communication module is configured to, upon receipt of a recharging instruction, ensure the recharging of the first electrical energy storage device from the electric power source,
the second communication module is configured to transmit, upon receipt of said recharging instruction destined for the first communication module, said recharging instruction to the first communication module,
the supervision module is configured to check whether at least one recharging condition of the first electrical energy storage device is satisfied depending on the first set of data and on the second set of data, and when the recharging condition is satisfied, transmit to the second communication module said recharging instruction destined for the first communication module.

6. The micro-grid according to claim 5, wherein said at least one recharging condition of the first electrical energy storage device includes a condition according to which the measurement related to the actual state of charge of the first electrical energy storage device is below a predetermined threshold value of charge of the first electrical energy storage device depending on at least one of the data of the first set of data and on at least one of the data of the second set of data.

7. The micro-grid according to claim 5, wherein the first heating appliance is configured to power the first heater member from the first electrical energy storage device as long as the measurement related to the actual state of charge of the first electrical energy storage device is above a predetermined charge level and as long as the charging instruction has not been received.

8. The micro-grid according to claim 1, wherein the first set of data includes at least one of the data chosen from the following list: an information item making it possible to identify the first heating appliance on the micro-grid, a measurement of the power consumed by the first heating appliance, a measurement of the temperature of the environment of the first heating appliance, a temperature setpoint, an information item related to the presence or absence of a user.

9. The micro-grid according to claim 1, wherein the second communication module is configured to communicate with the supervision module by means of a first point access point accessible via the micro-grid, and wherein the second communication module is configured to communicate with the supervision module by means of a first backup access point accessible via the micro-grid, when the first access point does not make it possible to establish a functional connection with the supervision module.

10. The micro-network according to claim 1, wherein the second communication module is adapted, by means of a second access point accessible via the micro-grid, to receive data from a smart electric meter deployed on the electric power source, the second set of data including at least one data related to the electric power source obtained from the smart electric meter.

11. The micro-grid according to claim 1, wherein the second communication module is adapted, by means of a third access point accessible via the micro-grid, to receive data from an electricity-producing device coupled to the electric power supply source and/or an electricity-consuming device powered by the electric power source, the second set of data including at least one data related to the production device and/or at least one data related to the consuming device.

12. The micro-grid according to claim 1, wherein the second communication module is configured to record the first set of data and/or the second set of data, when the transmission of the first set of data to the supervision module and/or the transmission of the second set of data to the supervision module is not possible, wherein the second communication module is configured to transmit the first set of data as recorded data and/or the second set of data as recorded data, once the possibility of transmitting the first set of data and/or the second set of data to the supervision module has been restored.

13. The micro-grid according to claim 1, further including a third heating appliance provided with a third communication module configured to communicate with the supervision module by means of a secondary access point accessible via the micro-grid, wherein the second communication module is configured to transmit to the third communication module the first set of data and the second set of data, when the second communication module cannot transmit to the supervision module the first set of data and the second set of data, the third communication module being configured to:
obtain, and transmit to the supervision module by means of the secondary access point, the first set of data and the second set of data, transmit, upon receipt of a cut-off instruction destined for the first communication module by means of the secondary access point, said cut-off instruction to the first communication module.

14. An electrical installation comprising at least one micro-grid according to claim 1 in which said at least one first heating appliance is electrically connected to an electric power supply source delivering a direct electric voltage and comprising all or part of the following elements: photovoltaic panels, a fuel cell, a supercapacitor, an electrochemical cells assembly-based battery, and a wind turbine.

* * * * *